Aug. 25, 1925.
G. PFISTER
1,551,427
UTILIZATION OF GREEN FODDER
Filed March 14, 1924
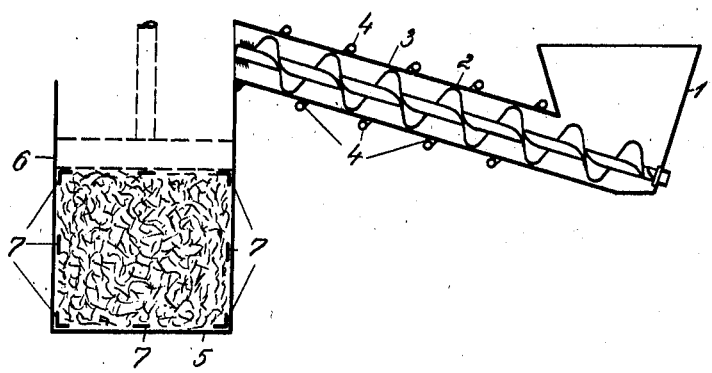
Inventor
Gerold Pfister
by Knight Bro
attorneys Patented Aug. 25, 1925.

1,551,427

UNITED STATES PATENT OFFICE.

GEROLD PFISTER, OF DRESDEN, GERMANY, ASSIGNOR TO SIEMENS-SCHUCKERTWERKE GESELLSCHAFT MIT BESCHRÄNKTER HAFTUNG, OF SIEMENSSTADT, NEAR BERLIN, GERMANY, A CORPORATION OF GERMANY.

UTILIZATION OF GREEN FODDER.

Application filed March 14, 1924. Serial No. 699,327.

*To all whom it may concern:*

Be it known that I, GEROLD PFISTER, a citizen of Germany, residing at Dresden A., Germany, have invented certain new and useful Improvements in the Utilization of Green Fodder, of which the following is a specification.

My invention relates to improvements in processes for preserving green fodder.

As is well known, it has been customary to preserve and store green fodder for considerable periods of time by placing it in large receptacles or silos, after it has been put into a preservable state by temporary heating.

According to the present invention, green fodder is first heated to a temperature sufficient to preserve it, i. e. to about 50° C., after which it is compressed and tied to form individual bales of portable size.

The herein described method of preserving green fodder is of extreme economic importance in agriculture. Up to now the farmer has been able to use only the green fodder on his own farm or at best that on farms in the near neighborhood. Otherwise green fodder has usually been lost to the farmer who was thus obliged to limit his yearly production even when the scientific cultivation of his ground demanded that he should grow green fodder. My invention enables green fodder to be made into an article of commerce. There is no longer any reason why green fodder should not be grown in any desired quantities. According to my invention the fodder is treated in small power plants, which may be the common property of a number of farmers in the neighborhood, and is thus converted into a portable agricultural product, which may be sold and transported by rail or in any other manner like any other product of the soil. As the green fodder does not lose its nutritious qualities to any appreciable extent by the treatment herein described, it is quite suitable for feeding cattle during the winter without supplementing it by other strengthening food. Green fodder which is in itself poor in starch and albuminous substances can easily be mixed with highgrade vegetable matters. The improved method is particulariy suitable to be carried on by machinery. Thus green fodder can be passed through suitable heating apparatus immediately before being pressed into bales and the operation thus made continuous.

Suitable apparatus for carrying out the improved process is shown on the accompanying drawing which shows a diagrammatic longitudinal section of one embodiment of such apparatus.

Referring to the drawing it will be seen that the fodder may be introduced into a hopper 1 from which it is removed by a worm conveyor 2. The fodder is thus passed through a tube 3, heated by pipes 4. At the upper or open end of tube 3, the fodder drops into a receptacle 5. As soon as this receptacle is charged up to a suitable level a piston 6 descends and compresses the fodder. The fodder is thus formed into a bale of suitable size for farming purposes, say, for example, a cube of from 1½ to 3 feet. In order to facilitate the tying up of the bale wooden laths or flat strips 7 are placed within the receptacle 5 prior to the introduction of the green fodder, said laths being lifted out together with the bale and firmly bound with the bale by wire. The bale is then conveyed to cool storage rooms where the temperature is reduced.

A bale thus prepared keeps well and may be stored for a considerable time. The surface layer will, however, be liable to spoil to a small depth, to which the air can penetrate. This outer layer forms a protection for the fodder in the interior of the bale, which remains preserved as excellent cattle fodder. The loss due to spoiling in the surface layer, may be diminished or entirely eliminated by treating the surface in known manner with substances which reduce the vitality of organic germs and lessen fermentation as well as the formation of mold or the like without impairing the quality of the green fodder. For this purpose, dilute hydrochloric acid is suitable. Naturally, the loss within the surface layer is lessened by reducing the surface of the vegetable matters coming in contact with the air. For this reason it may be advisable to trim the surface by suitable knives. In this manner not only is a smooth surface produced, but those parts of the green fodder, around the edges are less exposed to the pressure of the press and therefore in a loose condition, may be removed. Instead of treating the surface with disinfecting substances, they may be protected with a protecting layer, for instance by squirting, coating or dipping them into glue, dextrine, varnish or similar liquids.

The compression of the fodder after heating has for its object on the one hand, to drive out the enclosed air, in order to render impossible any organic activity within the vegetable cell itself and on the other hand it serves to give the required strength for transporting and handling the bale. Any loss in vegetable sap occurring during compression can be taken into account without considerable loss of nutritive substances.

The finished bale must be cooled quickly, in order to prevent the formation of butyric, acetic, and similar acids, which are liable to be produced if the cooling is effected slowly. Their formation may also be prevented by inoculating the vegetable matters in the heated state with bacteria of lactic acid. The lactic acid fermentation can then develop at temperatures between 40° and 70° C. and no special provisions need be made for cooling the bales quickly down to low temperatures. By the development of lactic acid bacteria neither are albuminous substances decomposed nor are the nutritive values of the vegetable matters reduced. On the contrary the digestibility of the fodder is increased.

Attempts have already been made to prevent the formation of undesired organic substances by the lactic acid inoculation of cold fodder, which had not been previously treated. Such attempts only lead to success under special circumstances, the fodder generally being too cold for treatment with lactic acid. But even if a temporary temperature rise takes place the lactic acid present does not suffice to prevent the undesired chemical process.

What I claim as my invention and desire to secure by Letters Patent is:—

1. Process for preserving green fodder for transportation, said process consisting in heating the fodder to a degree of temperature necessary for its preservation, in compressing the fodder thus treated, and in binding it into bales to exclude the air therefrom and for retaining the natural moisture in said fodder during transportation.

2. Process for preserving green fodder, consisting in heating the fodder to kill bacteria detrimental to the nutritious substances therein, in compressing and binding the fodder thus treated into bales, and finally in treating the outer layer of said bales with a liquid to reduce bacterial action therein.

3. Process for preserving green fodder consisting in heating said fodder to kill bacteria detrimental to the nutritious substances therein, in compressing and binding the fodder thus treated into bales, and in treating the outer layers of said bales with a liquid capable of reducing bacterial action in said outer layer and of forming an impervious layer thereon.

4. Process for preserving green fodder for transportation, said process consisting in heating the fodder to a degree of temperature necessary for its preservation, and treating it with lactic acid bacteria, in compressing the fodder thus treated, and in binding it into bales to exclude the air therefrom and for retaining the natural moisture in said fodder during transportation.

5. Process for preserving green fodder, which consists in treating said fodder with heat and lactic acid bacteria to counteract the action of detrimental bacteria to the nutritious substances contained therein, in compressing and binding the fodder thus treated, and finally in treating the outer layers of the bales thus formed with a liquid forming an impervious layer thereon.

6. The process of treating green fodder to prepare it for transportation as an article of commerce, which process consists in heating the green fodder to kill bacteria detrimental to the nutritious substances therein, and in treating the outer layer thereof with a liquid capable of reducing bacteria action therein and restricting access of air thereto.

In testimony whereof I affix my signature.

GEROLD PFISTER.